Figure 1:
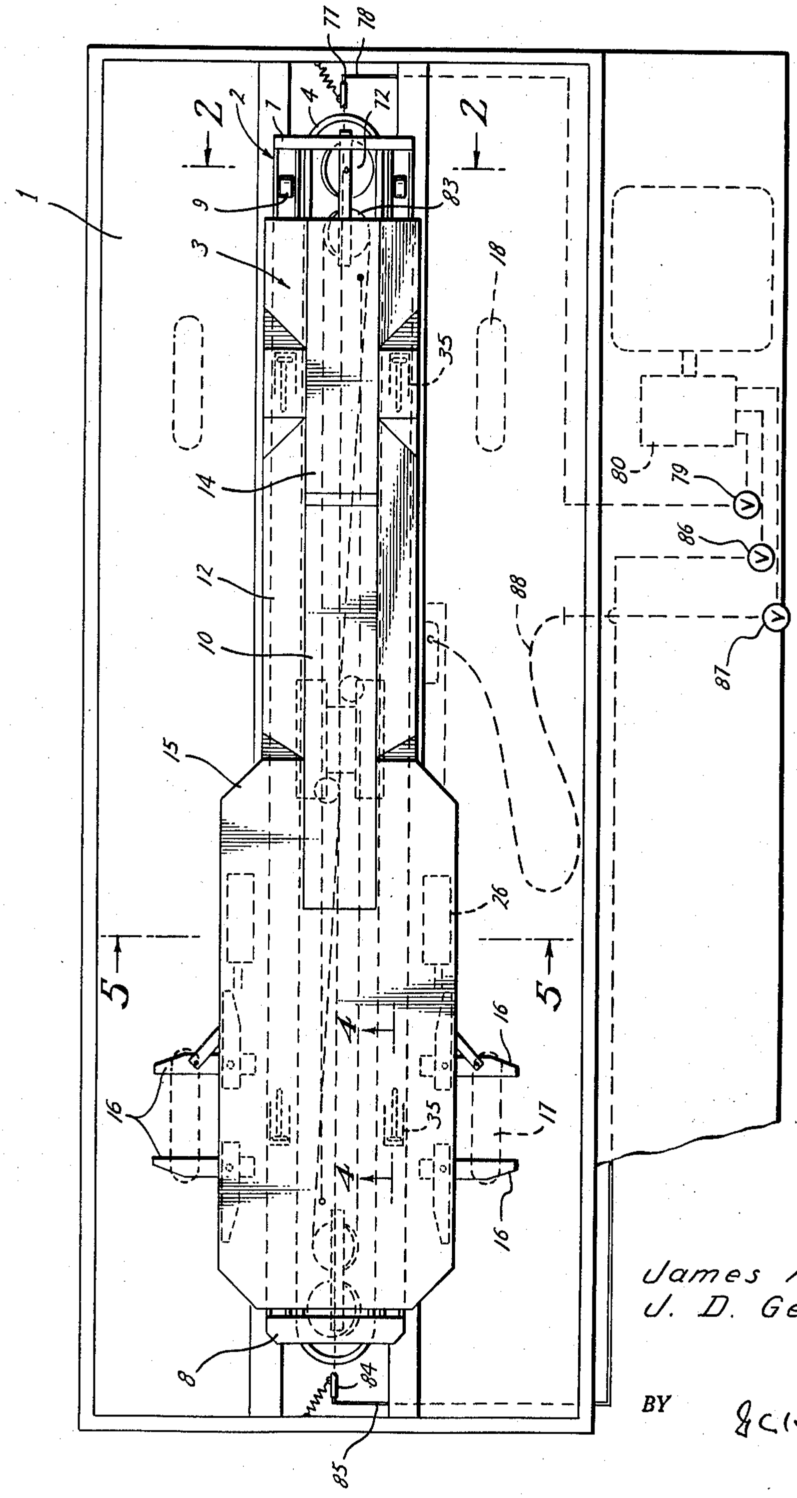

Aug. 26, 1958 J. A. SMITH ET AL 2,849,131

VEHICLE PARKING ELEVATOR

Filed May 24, 1957 6 Sheets-Sheet 1

James A. Smith
J. D. George
INVENTORS

BY J. C. Helming

ATTORNEY

James A. Smith
J. D. George
INVENTORS

BY J C Helmig

ATTORNEY

Aug. 26, 1958 J. A. SMITH ET AL 2,849,131

VEHICLE PARKING ELEVATOR

Filed May 24, 1957 6 Sheets-Sheet 3

James A. Smith
J. D. George
INVENTORS

BY G C Helmig

ATTORNEY

Aug. 26, 1958 J. A. SMITH ET AL 2,849,131

VEHICLE PARKING ELEVATOR

Filed May 24, 1957 6 Sheets-Sheet 4

James A. Smith
J. D. George
INVENTORS

BY [signature]

ATTORNEY

James A. Smith
J. D. George
INVENTORS

BY [signature]

ATTORNEY

VEHICLE PARKING ELEVATOR

Filed May 24, 1957

James A. Smith
J. D. George
INVENTORS

BY [signature]

ATTORNEY

United States Patent Office 2,849,131
Patented Aug. 26, 1958

2,849,131

VEHICLE PARKING ELEVATOR

James A. Smith and Jeffrey D. George, Houston, Tex., assignors, by mesne assignments, to Mechanical Parking Systems, Inc., Houston, Tex., a corporation of Texas Application May 24, 1957, Serial No. 661,443
6 Claims. (Cl. 214—95)

This invention relates to automobile parking structures and more particularly to handling apparatus of the type involving an elevator platform having a lift and transfer dolly which when the platform is brought into alignment with a selected one of a tiered group of parking stations or stalls, can be projected under an automobile for lifting it from the ground and transferring it by dolly retraction on the elevator platform, which can then be shifted to convey the automobile to and transfer it into another stall by again projecting the dolly off the platform and lowering the automobile to the floor.

An object of the invention is to provide an improved elevator assembly whose load carrying platform has a trackway beneath its floor for suspending and guiding on a straight line a longitudinally reciprocable guide member by which is carried underneath the platform the major bulk of the fairly large size power drive motor and drive transmitting mechanism for the transfer dolly and which guide member projects upwardly through an elongated opening in the platform floor and provides longitudinal guide bearing for telescopic engagement by the wheeled dolly as a trackway in maintaining a straight-line path during dolly travel off of and back on the platform and thereby enables over-all height of the dolly and its lifter mechanism when lowered to be kept to a minimum for easy insertion under the low road clearance running gear of present day automobiles and for avoidance of damage to the automobile undercarriage parts.

Another object of the invention is to provide a dolly lift frame with transversely extensible arms at one end to engage under and cradle the front wheels of an automobile and with a centrally disposed flat plate at the other frame end to be elevated into seating contact with a rear axle differential case of the vehicle running gear and which bearing plate has its front and rear margins spaced from the front wheel cradling arms so as to present a length of flat bearing face to accept rear axles of various automobiles whose wheel bases differ from one another within the currently popular range.

A further object of the invention is to provide improved drive mechanism for a transfer dolly together with power actuated wheel cradling arms whose operation upon engagement with stationary wheels of an automobile can cause a shifting of the dolly into longitudinally centered relation with the automobile to be picked up and transferred and which wheel cradling and centering operation is followed by actuation of the lift frame linked to the dolly base frame by mechanism restricting relative movements of the two frames to a limited vertical path and without substantial relative horizontal shift of the automobile during vertical movement.

Figures 2, 3, 4:
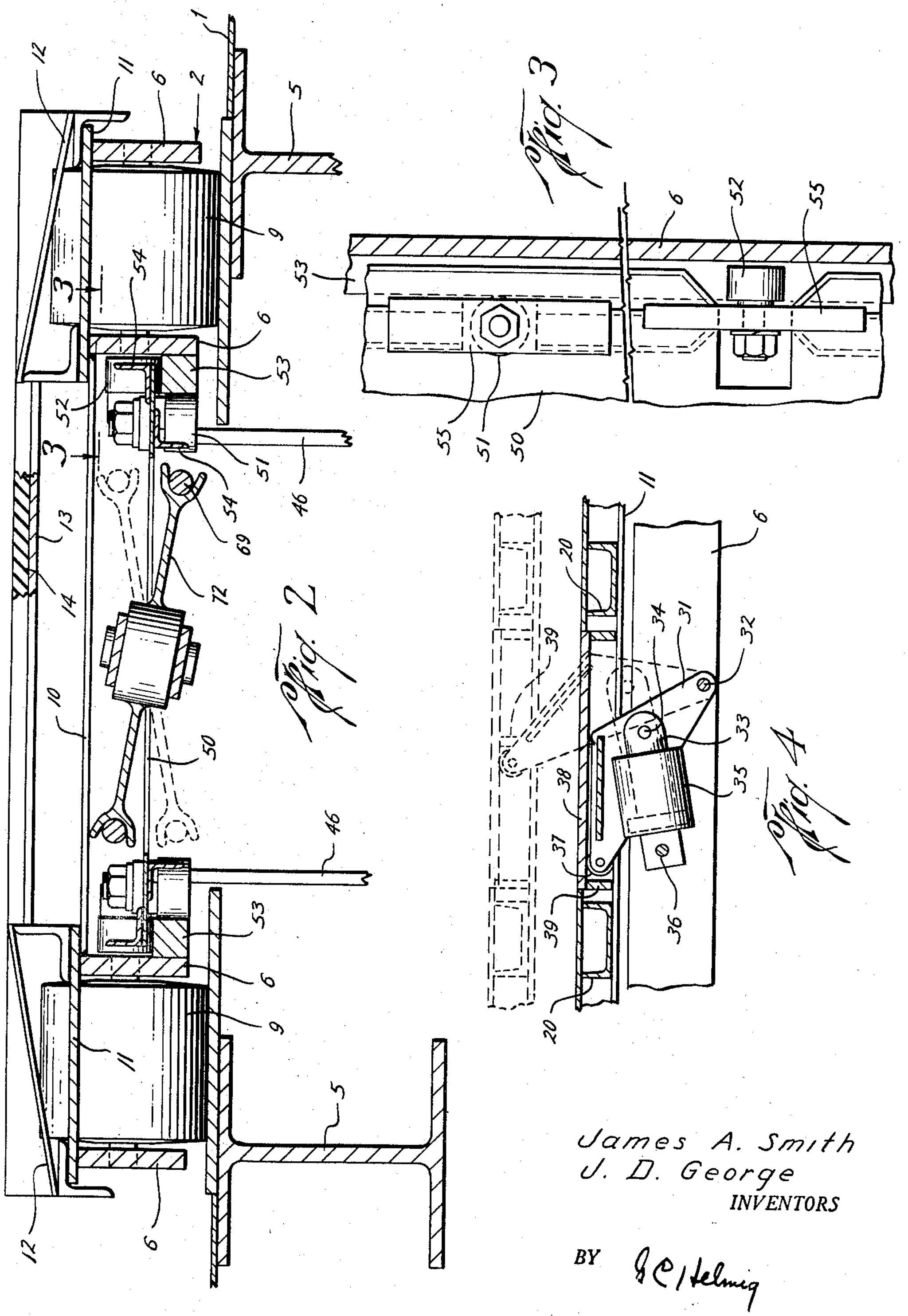
Figure 5:
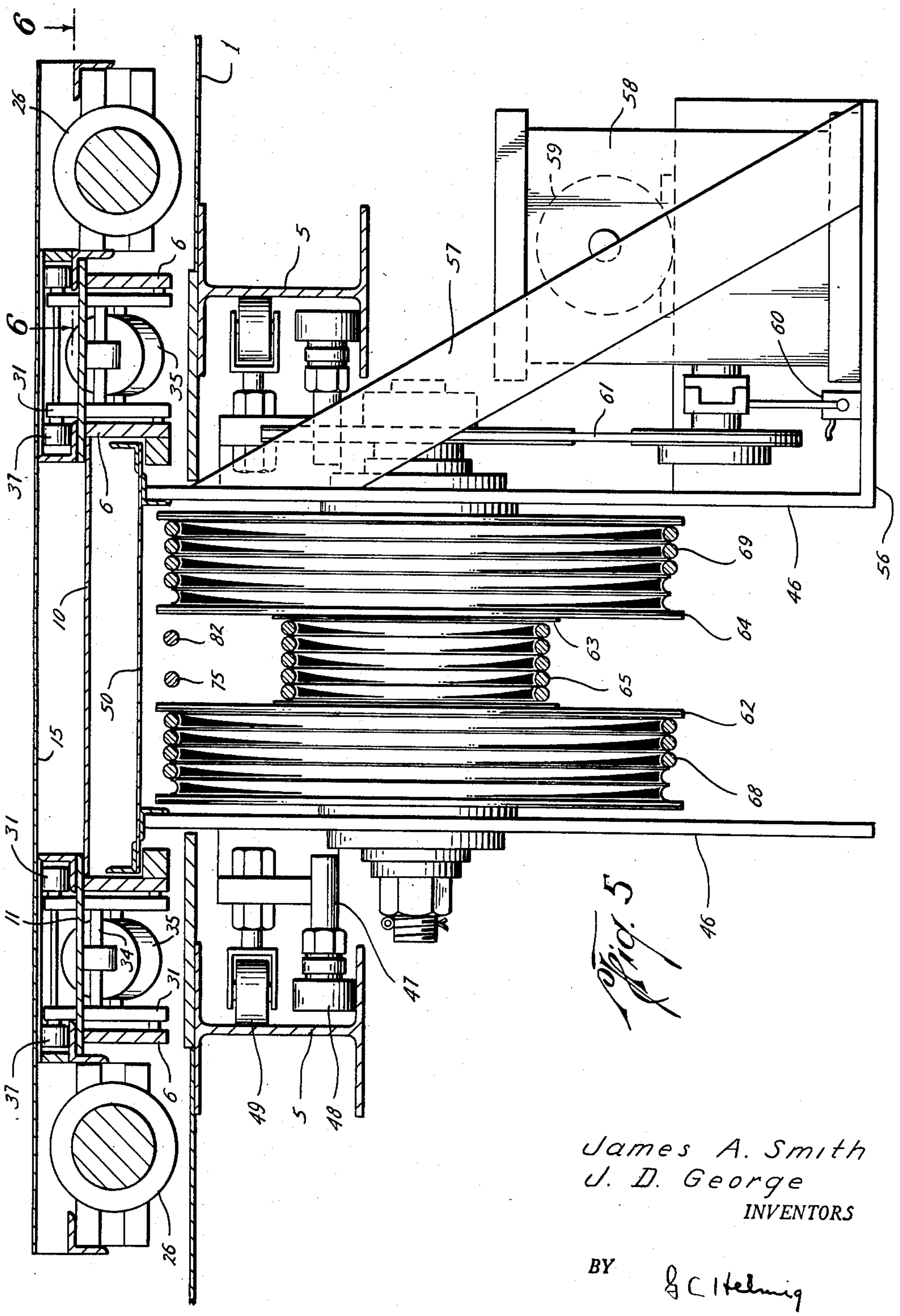
Figures 6, 7, 8:
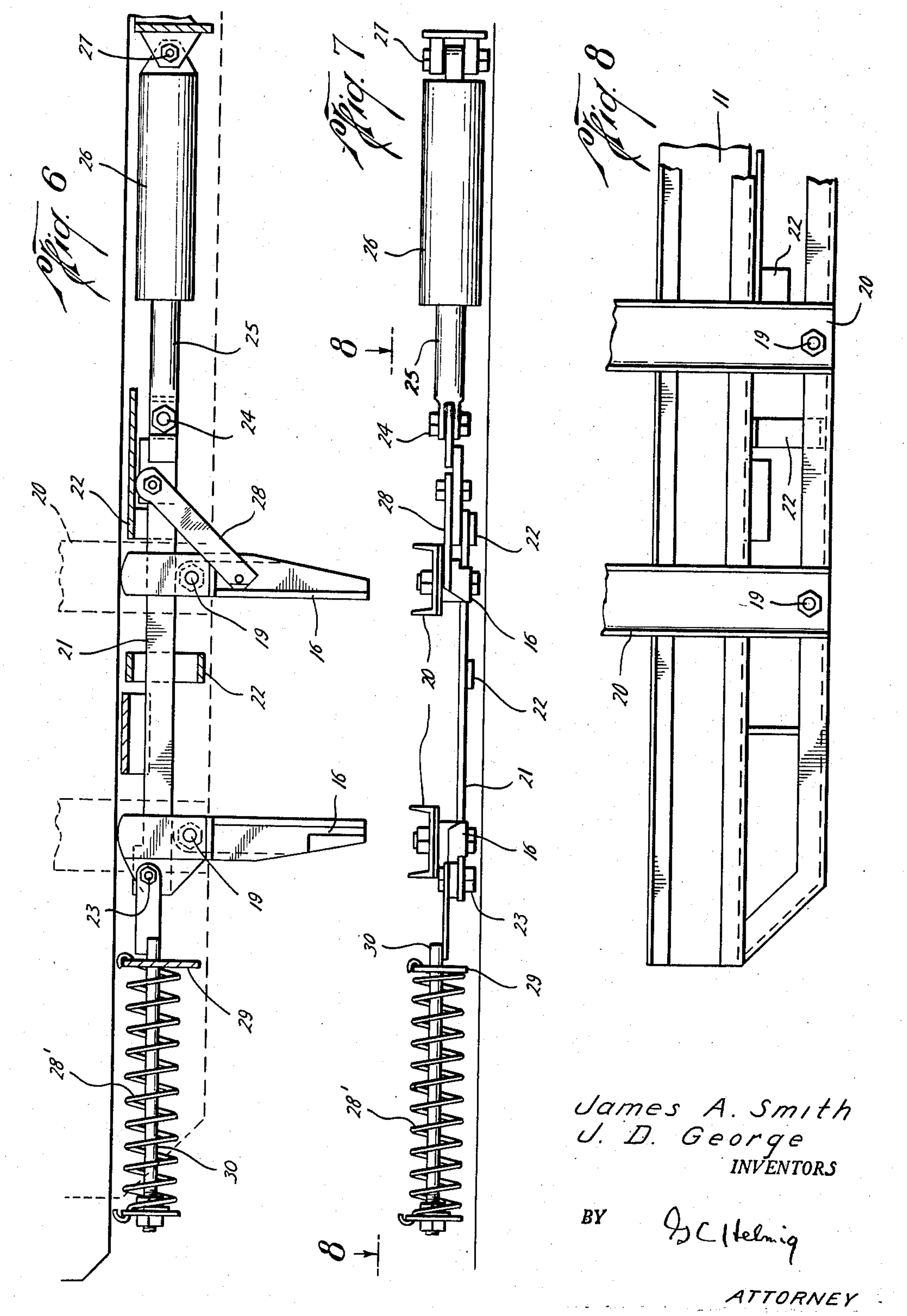
Figures 9, 10, 11:
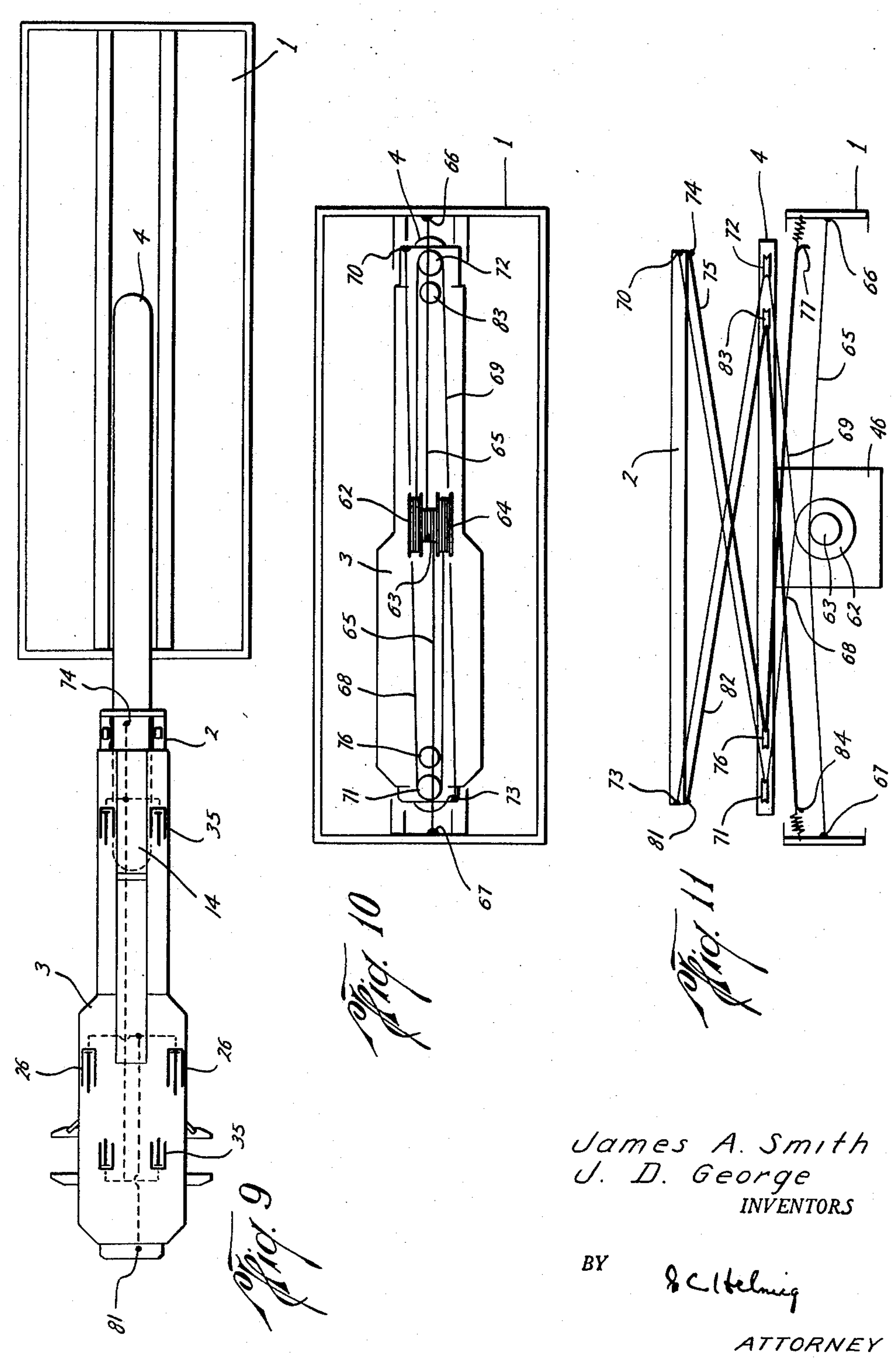
Figure 12:
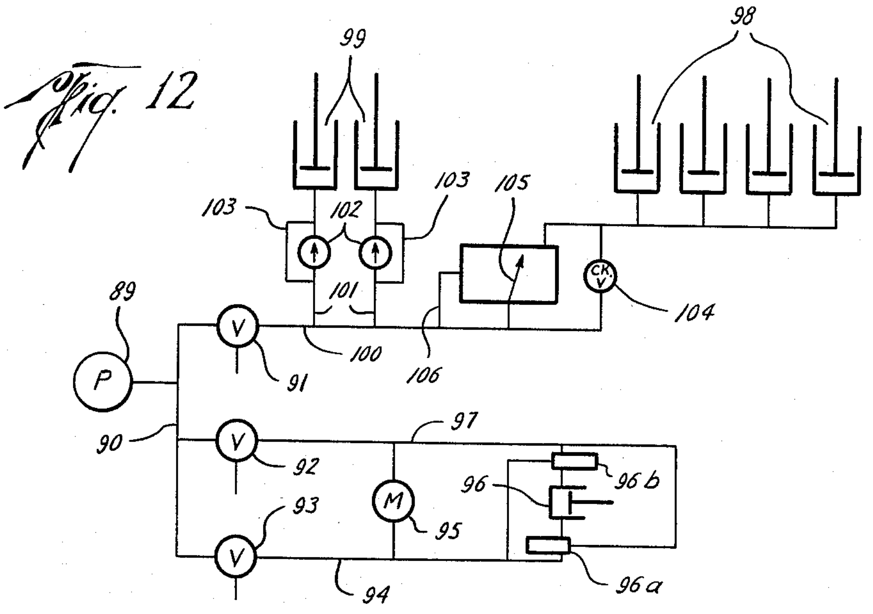
Figure 13:
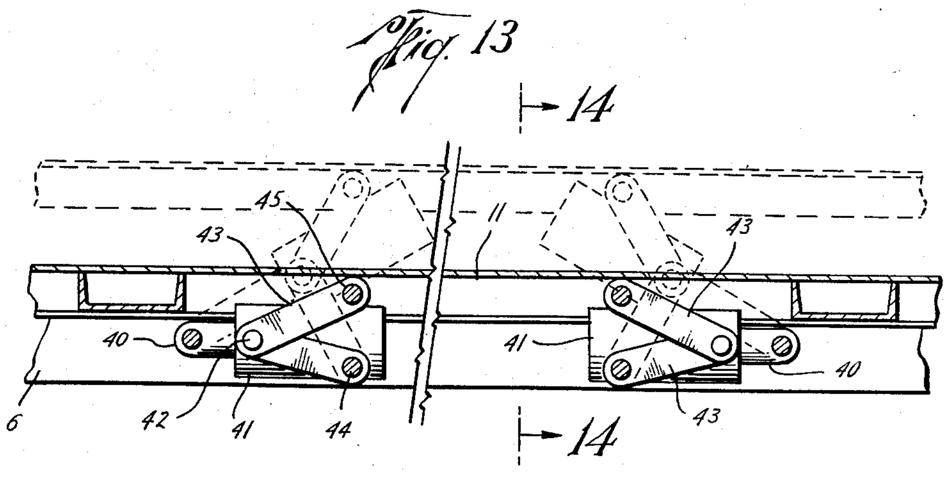
Figure 14:
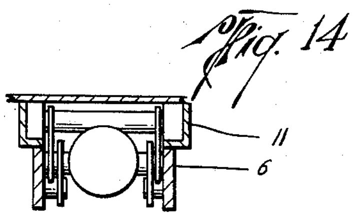

Other objects and advantages will become apparent during the course of the following specification having reference to the accompanying drawing wherein Fig. 1 is a top plan view of an elevator assembly with the parts in relative positions for conveying an automobile thereon; Fig. 2 is a transverse vertical section on line 2—2 of Fig. 1; Fig. 3 is a transverse longitudinal section on line 3—3 of Fig. 2; Fig. 4 is a side elevation with parts in section of fragments of the dolly frames and one of the power lift devices between the frames; Fig. 5 is a transverse vertical section as on line 5—5 of Fig. 1; Fig. 6 is a fragmentary top plan view of a pair of projectable wheel cradling arms and their operating linkage with parts in section as viewed on line 6—6 of Fig. 5; Fig. 7 is a side elevation of the parts shown in Fig. 6; Fig. 8 is a fragmentary top plan view as on line 8—8 of Fig. 7; Fig. 9 is a schematic plan view showing the transfer dolly fully projected off the platform and into a storage stall and the hookup of power feed connections to hydraulic motors associated with the dolly; Figs. 10 and 11 are a plan view and side elevation respectively diagrammatically representing the power transmitting mechanism for the dolly; Fig. 12 is a hydraulic circuit diagram illustrating an arrangement suitable for effecting the control of the relatively movable parts; Fig. 13 is a fragmentary side elevation of dolly lifter mechanism; and Fig. 14 is a transverse section of the toggle lift connection of Fig. 13.

The transfer mechanism shown in the drawings is applicable to any of the usual types of tiered automobile parking garages, which is to say that the movable elevator platform may run on vertical tracks fixed in a shaft or carried on a laterally shiftable frame serving a number of side by side stations on each of several floors and on either or both sides of the platform. Additionally, the elevator may be of a width to accommodate several automobiles side by side, in which case there may be employed more than one transfer dolly, or in such wide elevator assembly either a single dolly and its platform floor or multiple dolly assemblies may be arranged to be shuttled sideways on transverse tracks. Any conventional guide and power-lift mechanism can be employed, and for simplicity the drawings here show merely an elevator platform assembly as including a floor 1 for vertical movement between aligned relations with the floors selectively of several automobile storage stalls and a lift and transfer dolly for projection on and off the floor 1, when the latter is aligned with any stall.

The dolly to be described in detail is longer than the wheel base of the longest automobile to be handled; is narrower than the usual transverse distance between automobile wheels, and initially is lower than the road clearance beneath the automobile undercarriage and above ground level so that the dolly may be projected from the elevator platform and under an automobile to be conveyed from one to another station. Low dolly height is attained in part by interfitting relatively movable elements and more particularly by locating bulky drive mechanisms underneath the platform. To that end, the traveling dolly comprises a pair of superposed rectangular frames 2 and 3, the base or lower of which is wheeled to roll longitudinally on the floors of the platform and an aligned stall and is provided with power actuated lifter devices for raising and lowering the upper frame 3 and an automobile engaged thereby. Also, the base frame 1 is provided with longitudinal guide surfaces telescopically fitted to an inner traveling guide member 4, whose length substantially corresponds with the length of the base frame 2 and whose travel distance approximates half that of the base frame. Longitudinal travel of the telescopic guide member 4 is confined to straight line reciprocation by a pair of transversely spaced suspension tracks, conveniently constituted by floor supporting I-beams 5 (see Fig. 5) fixedly positioned under the platform 1 and engaged by dependent extensions on the inner guide member 4 intermediate its length and projected downwardly through a longitudinal slot or elongated opening in the platform floor 1 centrally of the suspension I-beam tracks 5. Such dependent extensions, in addition to transferring the load of the inner guide member 4 into the suspension tracks 5, also afford an out-of-the-way mounting for the large size power drive mechanism, whose operation effects projection and retraction of the dolly.

The base frame 2 of the transfer dolly consists primarily of four longitudinally projected side straps or bars 6—6 set in vertical planes arranged in two pairs on opposite sides of the inner guide member 4 and joined together by transverse end framing members 7 and 8. Each pair of side bars 6 are transversely spaced apart a distance to receive between them a series of longitudinally spaced apart rubber tired wheels or rollers 9 rotatably mounted on transverse axles carried by the side bars 6—6. The rollers run on the platform floor and the floor of any storage stall with which the platform may be aligned and constitute the supporting means by which the dolly is transferred on and off the elevator platform. In addition to the end framing members 7 and 8, the innermost bars 6 of the two pairs, and as best seen in Fig. 2, may be tied together throughout portions or all of their longitudinal extent by a horizontal plate or plates 10 edge welded to the bars.

The lift frame 3 of the dolly includes a pair of longitudinally extending structural steel side members 11—11, which for high strength and low vertical dimension are of Z-shape in section, providing a wide horizontal web with inner upwardly and outer downwardly projected side stiffening flanges. Downwardly and outwardly inclined plates or straps 12 extended between and welded to the upper margins of the side flanges, as can be seen in Fig. 2, are employed to afford a triangular structural shape. The side members 11 are transversely spaced apart to overlie and to rest on the upper edges of the two sets of side bars 6—6 when the lift frame is in its lowered position, indicated in Fig. 2. In vertical alignment with each roller 9 the horizontal webs of the side members 11 are relieved or cut away to receive and clear the tops of the rollers. Fig. 2 shows a flat metal plate 13 projected horizontally across the central space between and edge welded to the inner flanges of the side members 11 and slightly below the upper flange edges to form a pocket for the reception of a rubber or other soft, resilient facing or pad 14. In longitudinal dimension (see Fig. 1) this plate 13 with its top facing 14 extends between its forward and rearward margins for a little more than about one-fourth the length of the lift frame and affords a long area of lift surface or load bearing seat for an automobile rear axle differential housing when the frame is lifted. The centrally disposed portion of the rear axle running gear of a short wheel base automobile will be borne by the forward portion of the bearing pad and that of a longer wheel base automobile will be borne by pad portions rearwardly toward the more remote end of the pad.

As shown at the left in Fig. 1, the forward region of the lift frame 3 is overlaid by a flat metal plate 15 of greater width than frame width so as to overhang the frame along both sides. These overhanging side extensions protectively conceal outrigger mounted operating mechanisms for front wheel cradling arms 16 arranged in co-operating pairs for projection from opposite sides of the lift frame. With the wheel cradling arms retracted, they will lie, as shown by dotted lines in Fig. 1, inside the lateral marginal confines of the overhanging plate 15 for movement under an automobile. Also by broken line representation, there are shown in Fig. 1 the front and rear automobile wheels 17 and 18 respectively for an indication of proportions and relationships of the operating mechanisms.

Each pair of wheel cradling arms 16, as in Figs. 6 and 7, comprise swinging levers secured by journal pins 19 against the underside of upwardly opening and transversely extending channels or frame members 20, and they are powered to swing toward and away from one another between projected and retracted positions. In their outwardly projected position, their free ends are spaced apart a distance slightly less than the diameter of an automobile tire, and they are arranged to engage with the under tread of a tire just above its ground contact and fore and aft thereof. In this fashion they will receive and cradle the automobile wheel, and upon elevation of the lift frame 3 the front end of the automobile will move upwardly by reason of cradle arm engagement with both wheels and the rear end of the automobile will be elevated as its rear axle is contacted and raised by the rubber faced pad 14. The rubber facing for the pad and the rubber tread on the front wheels provide a cushioning contact and eliminate metal to metal contact between the automobile and the transfer dolly. The rubber surfaced dolly wheels and guide rollers also contribute to quiet and shock resistant operation.

For operating the wheel cradling arms 16 in unison, there is provided, as seen in Fig. 6, a longitudinal slide bar 21 having slide bearing on frame carried straps 22 and being pivotally connected at its forward end by a pin 23 to an arm of the forward lever 15 and being pivotally connected at its rearward end by a pin 24 to the piston rod 25 of a hydraulic piston motor whose cylinder 26 is hinged at 27 to the lift frame. A connecting rod or link 28 is pivoted at one end to the rearward portion of the slide rod 21 and is pivoted at its opposite end to the rearmost swing arm 16 in outwardly spaced relation to its pivot axis. This linkage arrangement causes the unisonal swinging of the two arms 16—16 between their projected and retracted positions. Movement to projected position is effected upon the supply of pressure fluid into the cylinder 26 for outward projection of the piston rod 25. Relief of fluid pressure enables retraction of the arm under the urging of a resilient spring force. The spring in this instance is conveniently in the nature of a tensionable spring 28' having one end anchored to a frame lug 29 and its other end anchored to the forward end of a rod 30 which projects rearwardly through the spring and slidably through the frame bracket 29 for pivotal connection with the connecting rod 21 by means of the pivot pin 23.

The connecting mechanism between the upper and lower frames 2 and 3 of the dolly consists of a number of power actuated links or levers arranged suitably along both sides of the frame and in front and rear pairs. Each unit, as shown in Fig. 4, may comprise a pair of transversely spaced swinging levers 31 fulcrumed at their lower ends on a pivot pin 32 carried by the pair of adjoining longitudinal frame bars 6. The fluid pressure piston and cylinder motor has its piston rod 33 hinged at 34 to the levers 31 and the piston cylinder 35 is hinged at 36 to the side bars 6, whereby upon the application of fluid pressure to the piston cylinder 35, the force will be transmitted through the piston rod 33 for swinging the levers 31 and causing elevation of the free ends of the levers in unison. These free ends carry rubber tired rollers 37 which run on the underside of a flat plate 38 secured to and forming a part of the lifter frame 3. At opposite limits of roller travel the plate 38 has associated with it a pair of stop abutment walls 39—39 which co-operate with the rollers at either limit to prevent relative horizontal movement of the upper and lower frame assemblies 2 and 3 in directions toward the rollers. In the arrangement as shown in Fig. 4, the upward swing of the levers 31 is toward the right or in a clockwise direction, and if this lever is considered as being near the forward ends of the frames, then the lifter levers at the opposite frame ends will be reversed so that the direction of lifting swing will be counterclockwise and the opposed longitudinal thrust forces will balance one another to maintain the path of the upper frame 3 substantially vertical, and the limit stops 39 co-operate to insure that the upper and lower frames will be longitudinally centered at their upper and lower limits respectively.

In lieu of the lifter links shown in Fig. 4, there may be advantageously employed the toggle linkage as shown in Figs. 13 and 14. Here the folding links at opposite ends of the frames are duplicative of one another except that they are reversed as to direction of applied power. In each case the two base frame side bars 6 pivotally mount between them the end of a piston rod 40 whose power cylinder 41 has oppositely extending pins 42 to each of which are journaled the interconnected knee of a pair of toggle links 43 whose far ends are pivotally joined one by a pin 44 to the frame bars 6 and the other by a pin 45 to the upper frame side member 11. The toggle linkage will positively confine the rise and fall of the upper frame member to a vertical path and will eliminate the likelihood of longitudinal displacement of the load by inertia.

The inner guide member 4 comprises an assembly including a pair of longitudinally extended and vertically disposed heavy steel straps or bars 46 which are transversely spaced apart a distance slightly less than the width of the elongated opening through the platform floor. Throughout their entire length the upper parts of the spaced bars 46 are located above the upper surface of the floor, but centrally of their length they carry, either as integral formations or as plates welded thereto, dependent extensions to project downwardly through the floor opening and for some distance therebelow. Thus in side elevation, as best seen in Fig. 11, each side bar 46 is generally of T-shape with its horizontal bar positioned above the floor and its vertical leg extending downwardly through the floor opening. Each dependent plate extension has on its outer face and adjacent the front and rear margins thereof a supporting bracket 47 (see Fig. 5) by which are mounted the rubber tired rollers 48 and 49. The several rollers 48 are mounted on horizontal axes and track on the horizontal flange of the I-beam or track 5, whereby to sustain the load of the intermediate guide member 4. The several rollers 49 are mounted on vertical axes and ride on the vertical web of the tracks 5 and in co-operation with one another they resist displacement of the guide member from a straight line path of travel.

Transverse brace members may be used to fixedly join the side bars 46 of the guide member, and one such suitable brace may consist of a horizontal strap or plate 50 welded to the top edges of the bars 46 throughout the length of the guide member. The opposite sides of the strap 50 may have sliding or rolling contact with the two innermost frame bars 6—6 of the dolly base frame 2 and thereby guide the dolly in its relative travel on and off the elevator platform. Preferably the guide contact is afforded by rubber tired rollers longitudinally spaced apart. Thus, as best shown in Figs. 2 and 3, two sets of rollers 51 and 52 carried on vertical and horizontal axes along each plate 50 ride on the side and upper surfaces of a rail 53 secured to and projected inwardly from an adjoining dolly frame member 6 near its lower edge. Angle iron stiffeners 54—54 extending longitudinally along the opposite margins of the top plate 50 are cut away adjacent the locations of the rollers to avoid interference therewith and in such regions the adjacent ends of the angle straps 54 are overlapped by bridging blocks 55 welded to the angles and carrying pivot axles for the respective rollers.

Referring now to the power drive mechanism for rolling the dolly to and fro, it will be seen in Fig. 5 that one of the dependent central extensions of the side bars 46 is formed with a horizontal shelf 56 extended laterally to one side and being braced by a diagonal strap 57. On this shelf 56 there is mounted a gear reduction box 58 and a hydraulic drive motor 59. The output drive shaft from the gear box 58 is coupled by a fluid pressure responsive hydraulic clutch 60 to a drive pulley connected by a roller chain or belt 61 to a driven pulley on a shaft having bearings at opposite ends in the two side rails 46. In the space between these rails the shaft has fixed thereon three cable winding drums 62, 63, and 64. The drums can be rotated in either direction from the reversible drive motor 59 whose pressure delivery conduits are joined in series relation with the pressure responsive clutch mechanism 60 for transmitting motor drive to the drums. In the absence of fluid pressure, the clutch 60 is disengaged, so that resistance from the drive gearing is eliminated to free the drums for rotation for a purpose to be later referred to.

The cable drum 63 is of smaller diameter than the drums 62 and 64. An intermediate length of a cable 65 is centrally fixed to and wrapped on the drum 63 and extends in opposite directions therefrom. Preferably, the cable 65 is in two sections and their adjacent ends engage the drum in separate windings terminally secured in axially spaced relation at opposite sides of the drum so that one cable winding wraps on beside the cable winding being paid off during drum rotation. As indicated in Fig. 11, the far end of one cable section is anchored at 66 to one end of the platform 1 and the remote end of the other cable section 65 is anchored at 67 to the other end of the platform 1. Accordingly, as viewed in Fig. 11, a clockwise direction of drum rotation will tend to wind up the length of cable extending to the anchorage connection 67 and pay off the length of cable anchored at 66, with the result that the inner guide member 4 will pull itself toward the left. Movement toward the right of the guide member and cable connection 66 will similarly occur upon counterclockwise direction of the drum 63.

Concurrent rotation of the larger drums 62 and 64 will wind up or pay off their respective cable windings 68 and 69 one opposite to the other. Thus if the cable 68 is considered as being wound on its drum 62 on clockwise drum rotation and inasmuch as its length away from the drum is anchored at its remote end at 70 at the end of the dolly opposite to the anchorage point 67 and the intermediate portion of the cable 68 is looped back over a pulley or sheave 71 carried by the plate 50 at the end of the guide member 4 opposite to the anchored end 70, the dolly will be pulled in the same direction as is the guide 4 but to a greater distance. The mechanical advantage will be controlled so that the inner guide 4 is projected only partly off the elevator platform while the dolly can be projected entirely beyond the elevator floor. The cable 69 leading from the drum 64 has its intermediate portion looped back around a sheave 72 at the end of the guide member 4 opposite to the end which carries the pulley 71 and the remote end of the cable 69 is fastened at 73 to the end of the dolly opposite to the anchorage point 70 for the other cable. Therefore, reverse drive rotation draws the dolly in the right-hand direction as viewed in Fig. 11.

The hydraulic lift motors may be connected in parallel by piping diagrammatically illustrated in Fig. 9, and the end of the pipe may be joined at 74 to an end of a flexible hose 75 which is looped back around a sheave 76 carried at the opposite end of the guide member 4, with the other end of the hose coupled at 77 to a pipe 78 carried on the lift platform and connected with a manually controlled valve 79 leading from the output side of a motor driven pump 80 preferably located under the floor of the platform. Similarly, the hydraulic motors for the projectable wheel engaging arms 16 can be piped in parallel relation to a coupling 81 located at the end of the dolly opposite to the coupling 74 and joined to a flexible hose 82, which, as seen in Fig. 11, has its intermediate portion entrained around a pulley 83 carried by the guide member 4 adjacent the pulley 72. The other end of the flexible hose 82 is coupled at 84 to an elevator carried pipe 85 which leads from a control valve 86 connected to the outlet of the pump 80. The pump outlet is also connected through a manual valve 87 to a pipe and flexible hose 88 which leads to the pressure responsive cltuch 60 and reversible drive motor 59. This will enable motor drive in one direction, and for reverse drive a similar flexible hose and valve connection with the motor will be required but has been omitted from the drawing for the sake of simplicity of illustration.

An alternative hydraulic system is diagrammed in Fig. 12. In this instance the pressure pump indicated at 89 delivers pressure fluid to a manifold 90 having three manually controlled multiple-way valves 91, 92, and 93, each having a pressure relief passage leading back to the sump of the pump and a pressure delivery passage leading to the devices to be operated. The pressure delivery line 94 from the valve 93 connects to the cable winding motor 95 for driving the cable drums in one direction, and also leads through a check valve 96*a* to the power clutch cylinder 96. Motor operation in the reverse direction is controlled by pressure flow through the line 97 leading to the motor 95 from the valve 92 and which line additionally connects with the clutch cylinder 96 through a check valve 96*b*.

Check valves 96*a* and 96*b* each may comprise a housing containing a slide piston spring-pressed to open position and movable to closed position in response to the application of fluid pressure thereon. A branch line connection between the pressure line 94 and the valve 96*b* will cause the latter to shift from open to closed position to cut off the clutch cylinder from the vented line 97. Similarly, the fluid pressure side of the valve 96*a* communicates through a branch line with the pressure line 97 for closing the vented line 94 from the clutch cylinder. In the absence of pressure fluid, both valves will be open and relieve pressure in the clutch cylinder for disengaging the clutch when the motor is out of operation.

The bank of lifter cylinders 98 and the power cylinders 99 for actuating the wheel engaging arms are connected in parallel with the supply line 100 leading from the valve 91 but mechanism is incorporated which enables response of the cylinders 99 for projecting the wheel engaging arms in advance of the raising of the lift frame 3 and additionally controls sequential relief of pressures for insuring the descent of the lift frame 3 in advance of retraction of the wheel engaging arms. Thus each branch passage 101 leading to a power cylinder 99 contains a one-way check valve 102 for free flow toward each cylinder and a restrict by-pass 103 around the check valve 102 for delaying the venting of the cylinders 99 as the check valve 102 closes upon movement of the valve 91 to dump position. The return connection from the bank of motors 98 contains a check valve 104 which opens for quick and free return flow from the pressure cylinders when the valve 91 is in dump position. In parallel with the check valve 104 is a delayed-action valve 105 through which pressure flow is delivered to the cylinders 98 but only after a given time interval following the actuation of the valve 91 to pressure delivery position. A conventional type of delayed-action valve is one in which a spring-pressed piston initially closes a communicating port through the piston but opens the port for free flow after the spring has been compressed under pressure fluid metered to one side of the piston through a restricted feed passage, shown at 106. Thus when the valve 91 is thrown to a pressure feed position, the pressure fluid first actuates the fluid motors 99 and after a given time interval actuates the valve 105 for sending pressure fluid to the motors 98. After the valve 91 is moved to relief position, the check valve 104 enables a free dumping of the pressure from the motors 98 while the check valves 102 close and delay or restrict the relief of pressure from the motors 99 to that controlled by the restricted by-pass 103.

When an automobile is to be transferred from one station to another, the platform 1 is moved into alignment with that station containing the automobile. With the wheel engaging arms 16 retracted and the lift frame 3 of the dolly in lowered position, the cable winding drums can be powered for projecting the dolly off the platform in either direction and below the automobile. Now, when the front wheel cradling arms 16 are swung to projected positions, they will engage with the adjacent wheels of the vehicle. Should these wheels not be in exact centered relation to the dolly, one or the other of the arms 16 will make initial contact with the wheels and by pushing on the wheel will shift the frame longitudinally until both arms contact with the tread fore and aft of the wheel. This shifting of the frame can easily occur, since at such time the hydraulically actuated clutch 60 is disengaged and eliminates the drag of the usual reduction gearing between the clutch and the hydraulic motor. Once the centering operation is complete, the lift frame rises and through both the projected tire engaging arms and the differential bearing pad carries the automobile upwardly and out of contact with the floor. Retraction of the dolly transfers the automobile onto the elevator platform, which may now be raised or lowered or shifted into alignment with a selected unloading stall, whereupon the dolly is again projected off of the elevator; the lift frame 4 is lowered and the wheel engaging arms 16 are retracted so that the dolly may be pulled back onto the elevator, leaving the automobile at the station selected.

The foregoing specification deals only with a preferred embodiment and it is to be understood that various modifications may be made as come within the scope of the appended claims.

What we claim is:

1. In an automobile transfer dolly of the character described, a frame adapted to extend longitudinally beneath an automobile, a pair of wheel engaging arms pivotally mounted on vertical axes on the frame for swinging in horizontal paths from retracted longitudinally extending positions and toward one another to outwardly projected substantially parallel and longitudinally spaced apart positions, a longitudinally extending connecting rod pivotally joined to both wheel engaging arms in spaced relation to their pivotal mounting, a power motor pivotally anchored to the frame and operatively joined to said connecting rod to move the same in the direction to project said wheel engaging arms and elastic means acting on said connecting rod and yieldably biasing the same in the arm retracting direction.

2. In an automobile parking lift and transfer assembly, an automobile receiving and conveying platform having a floor opening extending longitudinally in relation to an automobile to be received on the platform, an automobile lift and transfer dolly having supporting wheels to ride on the platform on both sides of said longitudinal opening, means to guide the path of travel of said transfer dolly on and off the platform and comprised of an inner guide member telescopically fitted to and having longitudinal guide bearing engagement with said dolly as a track therefor, said inner guide member being of a length substantially corresponding to the length of said dolly and having intermediate its length a dependent supporting assembly projected through said floor opening, supporting guide tracks fixedly mounted below said floor and engaged by said dependent assembly for supporting said inner guide member and guiding its longitudinal movement and power means carried by said dependent assembly and operatively connected with said platform and with said dolly to effect concurrent travel of said guide member and said dolly for the guided projection and retraction of the latter on and off said platform.

3. In an automobile lift and transfer assembly, an elevator platform floor having an elongated opening therein, a pair of supporting and guide tracks beneath the floor on opposite sides of said elongated opening, a traveling carrier suspended and guided by said tracks for straight-line travel in alignment with said opening, a series of power driven cable winding drums mounted on said carrier below the platform floor, an elongated guide member located above the floor and fixed as a unit with said traveling carrier and extended forwardly and rearwardly thereof, an automobile lift and transfer dolly arranged to ride on and off said platform floor and having telescopically guided bearing engagement with said guide member for travel relative thereto, oppositely projected cables having their ends remote from one another secured to the opposite ends of the platform and being entrained intermediate said remote ends on one of said drums, cable sheaves journaled on opposite ends of said guide member, a cable secured at its opposite ends to one end of the dolly and to a carrier mounted drum and entrained over the sheave at the end of said member opposite to said one end of the dolly, another cable secured at opposite ends to the other end of the dolly and to a carrier mounted drum and entrained over the sheave at the end of said member adjacent said one end of the dolly and power driven transmission means for said drum, said drums and transmission means being arranged for controlling cable winding actions at differential rates and for moving the traveling carrier and the dolly concurrently in the same direction at relatively different rates.

4. In an automobile lift and transfer assembly, a traveling dolly having vertically movable means to engage and support an automobile, an elevator platform for the projection therefrom and retraction thereon of said traveling dolly, guide tracking means on said platform, a shiftable guide member in telescopic bearing engagement with said guide tracking means on the platform and also with the dolly to guide dolly travel on and off said platform, a pair of spaced apart sheaves carried by said guide member, cable winding drums mounted on said shiftable guide member, cable means wound on one of said drums and projected therefrom in opposite directions, spaced apart cable anchoring connections carried by the platform and secured to the oppositely projected cables for shifting said guide member upon drum rotation, other cable means comprising separate lengths of cables having winding drum connections and being projected therefrom in opposite directions for entrainment over said sheaves respectively and for return projection and securement in spaced apart relation to said dolly for transmitting drum rotation to said traveling dolly in one direction through one of said cables and in the other direction through the other of said cables coincident with the shifting of said guide member in like direction.

5. In an automobile parking assembly, a load carrying platform floor having an elongated slot therein, suspension and guide tracking means extending beneath said floor and longitudinally of the slot, a longitudinally disposed guide member of T-shape in side elevation with its horizontal bar above said floor and its dependent leg projected downwardly through said slot, supporting and guide means carried by said dependent leg and engaged with said tracking means to accommodate longitudinal travel of said guide member relative to the platform floor, a cable winding drum rotatably mounted on said depending leg, cables extending in opposite directions from drum windings and being secured at opposite ends to spaced apart points on the platform for shifting said guide member upon drum rotation, an automobile supporting dolly having telescopic guide bearing on said guide member for longitudinal travel on and off said platform floor, a pair of power transmitting cables having ends secured to opposite ends respectively of said dolly and each projected from its secured end to the other end of the dolly, sheaves carried by said guide member about which said cables are looped and power actuated cable winding drum means rotatably mounted on the depending leg of the shiftable guide member and on which drum means the other ends of said cables are windable for effecting dolly travel relative to said shiftable guide member.

6. In an automobile parking assembly, a platform, a transfer dolly movable on and off the platform, a lift frame on the dolly, wheel engaging arms swingably mounted on said frame and movable toward one another to engage and cradle an automobile wheel between them, fluid pressure means connected with said arms to swing them toward one another, power driven means connected with the dolly for moving the same, a fluid pressure responsive disengageable clutch forming a part of said power driven means and valve controlled fluid pressure conduits connected with the clutch and said fluid pressure means and operable to effect clutch disengagement and the swinging of said arms into engagement with the wheel of an automobile and thereby the shifting of the dolly independently of the power driven means for centering said arms in relation to the automobile wheel.

References Cited in the file of this patent

UNITED STATES PATENTS

| | | |
|---|---|---|
| 1,817,220 | Young | Aug. 4, 1931 |
| 1,919,269 | Becker | July 25, 1933 |
| 1,962,127 | Balkema et al. | June 12, 1934 |
| 2,626,065 | Sanders et al. | Jan. 20, 1953 |
| 2,801,011 | Overlach et al. | July 30, 1957 |